US012701050B2

(12) United States Patent
Alizzi et al.

(10) Patent No.: US 12,701,050 B2
(45) Date of Patent: Aug. 4, 2026

(54) SYSTEMS AND METHODS FOR OPTIMIZED FINGERPRINTING AND TOKENIZATION IN SERVER DRIFT ANALYSIS

(71) Applicant: BANK OF AMERICA CORPORATION, Charlotte, NC (US)

(72) Inventors: Jason A. Alizzi, York, SC (US); John Andres Lozes, Wilmington, DE (US); Chia-Ho Yu, Ashland, VA (US); Daniel M. Maniotis, Oakland, NJ (US); Robert Bosi, Rock Hill, SC (US); Amit Jain, Hockessin, DE (US); Pravesh K. Misra, Newtown, PA (US); Kevin Roy Carlson, Elizabeth, CO (US); Matthew E. Simon, Staten Island, NY (US); Tamer Badawy, Charlotte, NC (US); Sreeni R. Nair, Florence, NJ (US); Dharmendra Kumar Gupta, Mumbai (IN); Colin Childers, Charlotte, NC (US); Donna Lee Phillips, Elkton, MD (US); Richard Michael Foster, Elkton, MD (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 78 days.

(21) Appl. No.: 18/958,916

(22) Filed: Nov. 25, 2024

(65) Prior Publication Data

US 2026/0149639 A1 May 28, 2026

(51) Int. Cl.
| | | |
|---|---|---|
| *H04L 12/24* | (2006.01) | |
| *H04L 41/0866* | (2022.01) | |
| *H04L 41/5003* | (2022.01) | |

(52) U.S. Cl.
CPC ...... *H04L 41/0866* (2013.01); *H04L 41/5003* (2013.01)

(58) Field of Classification Search
None
See application file for complete search history.

(56) References Cited

U.S. PATENT DOCUMENTS

| | | | | |
|---|---|---|---|---|
| 2016/0112269 A1* | 4/2016 | Singh | .................... | H04L 43/065 |
| | | | | 709/224 |
| 2024/0362137 A1* | 10/2024 | Krishna | ............. | G06F 9/44505 |
| 2025/0258916 A1* | 8/2025 | Rowland | ............. | H04L 63/1416 |

* cited by examiner

*Primary Examiner* — Natisha D Cox
(74) *Attorney, Agent, or Firm* — Moore & Van Allen PLLC; Nicholas C. Russell

(57) ABSTRACT

Systems, computer program products, and methods are described herein for optimized fingerprinting and tokenization in server drift analysis. The present disclosure is configured to detect configuration drift across entire computer servers by utilizing distributed agents that collect and analyze metadata such as file modification dates, sizes, and cryptographic hashes. These agents sanitize sensitive information and conditionally tokenize environment-specific values, such as server names, IP addresses, and timestamps, to ensure accurate comparison across different servers and time periods. By automating the detection process, the system reduces manual intervention and minimizes resource usage, making it highly scalable for large, multi-server environments. Additionally, the system can group servers based on predefined parameters, compare their configurations, and identify discrepancies that may impact performance or security. The invention improves efficiency, accuracy, and security in server drift detection, making it particularly suited for complex, dynamic infrastructures such as enterprise data centers or cloud environments.

20 Claims, 4 Drawing Sheets

200

AT A SCHEDULED TIME, THE DISTRIBUTED AGENT ON THE SERVER COLLECTS CONFIGURED OR ALL NON-TRANSIENT CONTENT, INCLUDING SENSITIVE VALUES, AND COMPUTES CRYPTOGRAPHIC FINGERPRINTS FOR FILES OR DATA.
202

THE AGENT SANITIZES THE SENSITIVE DATA, REPLACING SENSITIVE VALUES WITH TOKENS TO ENSURE SECURITY.
204

THE AGENT TRANSMITS THE FINGERPRINTS AND THE SANITIZED CONTENT TO A CENTRALIZED HISTORICAL REPOSITORY FOR STORAGE, OPTIONAL TOKENIZATION (TO REMOVE ENVIRONMENT-SPECIFIC VALUES FOR CONSISTENCY) AND COMPARISON.
206

THE HISTORICAL REPOSITORY INGESTS AND PERSISTS THE RECEIVED FINGERPRINTS AND SANITIZED CONTENT, MAINTAINING A DATABASE OF SERVER METADATA FOR FUTURE DRIFT DETECTION ANALYSIS.
208

UPON USER REQUEST OR AT PRE-SCHEDULED INTERVALS, FOR A GIVEN TIME PERIOD AND A GROUPING OF SERVERS, THE SYSTEM RETRIEVES THE FINGERPRINTS OF THE ORIGINAL CONTENT (WHERE APPLICABLE, THE FINGERPRINTS OF TOKENIZED CONTENT AND THE SANITIZED CONTENT ARE RETRIEVED FROM THE REPOSITORY).
210

USING THE SEARCH AND COMPARISON ENGINE, THE SYSTEM COMPARES THE CURRENT OR HISTORICAL FINGERPRINTS AND CONTENT AGAINST OTHER CURRENT OR HISTORICAL FINGERPRINTS, IDENTIFYING ANY DIFFERENCES OR MISMATCHES IN THE CONTENT.
212

THE SYSTEM PRODUCES RESULTS SHOWING THE DETECTED DIFFERENCES, INCLUDING BOTH THE FINGERPRINT MATCHES AND ANY DRIFT IN THE ACTUAL CONTENT, WHICH CAN BE VISUALLY DISPLAYED FOR FURTHER ANALYSIS.
214

THE SYSTEM GENERATES ALERTS OR REPORTS BASED ON THE DRIFT DETECTION RESULTS AND DISTRIBUTES THEM TO ADMINISTRATORS FOR APPROPRIATE ACTION, ENSURING ANY ISSUES ARE ADDRESSED PROMPTLY.
216

FIGURE 2

SYSTEMS AND METHODS FOR OPTIMIZED FINGERPRINTING AND TOKENIZATION IN SERVER DRIFT ANALYSIS

TECHNOLOGICAL FIELD

Example embodiments of the present disclosure relate to systems and methods for optimized fingerprinting and tokenization in server drift analysis.

BACKGROUND

In large-scale computing environments, monitoring and maintaining the consistency of computer servers is crucial for operational efficiency and data integrity. A common challenge faced by system administrators and IT personnel is detecting "drift" in server configurations over time. Server drift occurs when the configuration of a server changes from its originally intended or approved state, potentially leading to operational failures, security vulnerabilities, or degraded performance.

Traditional methods for server drift detection often rely on manual inspection or semi-automated scripts that compare snapshots of server configurations at different points in time. These approaches can be resource-intensive, time-consuming, and prone to errors, especially when dealing with environments containing hundreds or thousands of servers. Furthermore, they may lack the ability to efficiently handle sensitive information, environment-specific data, or account for different deployment environments and time periods.

There is, therefore, a growing need for a more efficient and scalable solution to server drift detection, one that can process large amounts of configuration data, sanitize sensitive information, and account for the diverse conditions under which servers operate. Existing third-party and home-grown systems often fall short of these requirements, necessitating the development of more sophisticated tools capable of addressing these challenges.

Applicant has identified a number of deficiencies and problems associated with optimized fingerprinting and tokenization in server drift analysis. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for optimized fingerprinting and tokenization in server drift analysis. The present invention relates to an automated system and method for detecting "drift" across entire computer servers. By utilizing distributed agents that efficiently collect and compare server configuration data, the invention enables administrators to identify and resolve server drift more quickly and accurately. The invention addresses key challenges in server drift detection by incorporating data sanitization, tokenization, and highly optimized search and comparison techniques, making it suitable for large-scale computing environments.

Furthermore, the invention supports the detection of drift across different servers in varying deployment environments or time periods. By automatically tokenizing and sanitizing sensitive data, it ensures that configuration comparisons remain efficient and secure, even when handling environment-specific values such as IP addresses, domain names, or timestamps. The invention's ability to handle these data types makes it particularly well-suited for dynamic, multi-server infrastructures such as cloud environments or enterprise data centers.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
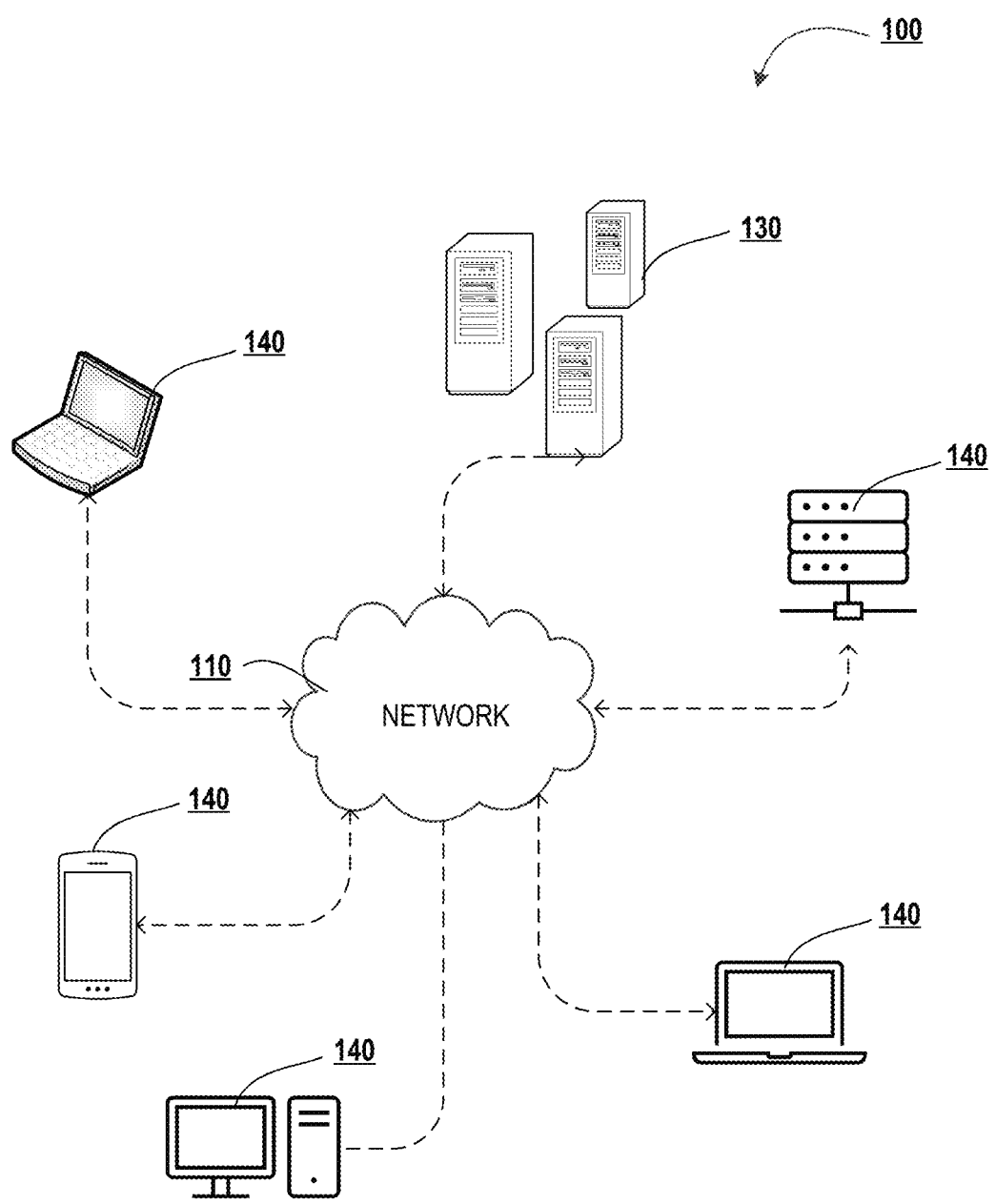
Figure 1B:
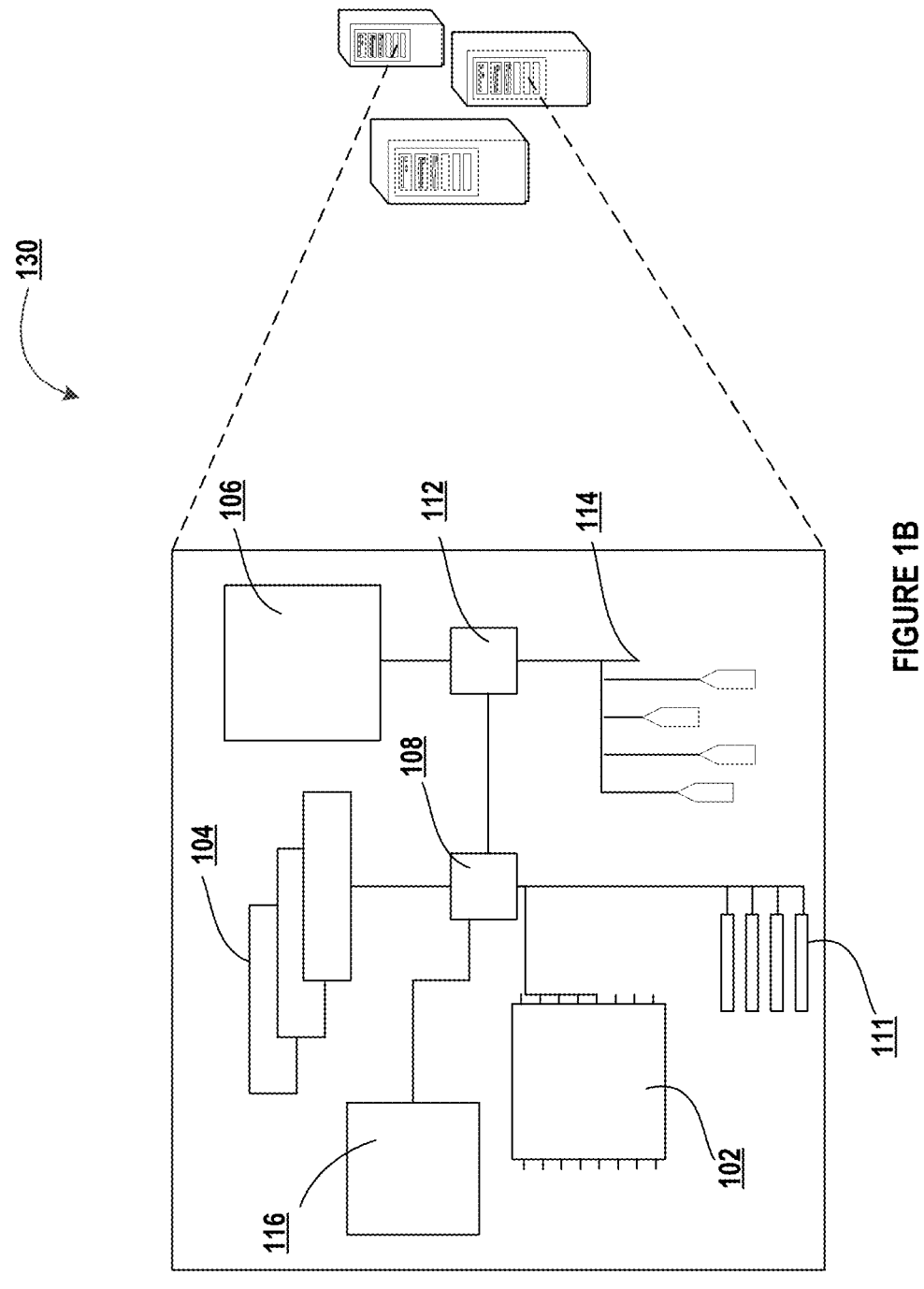
Figure 1C:
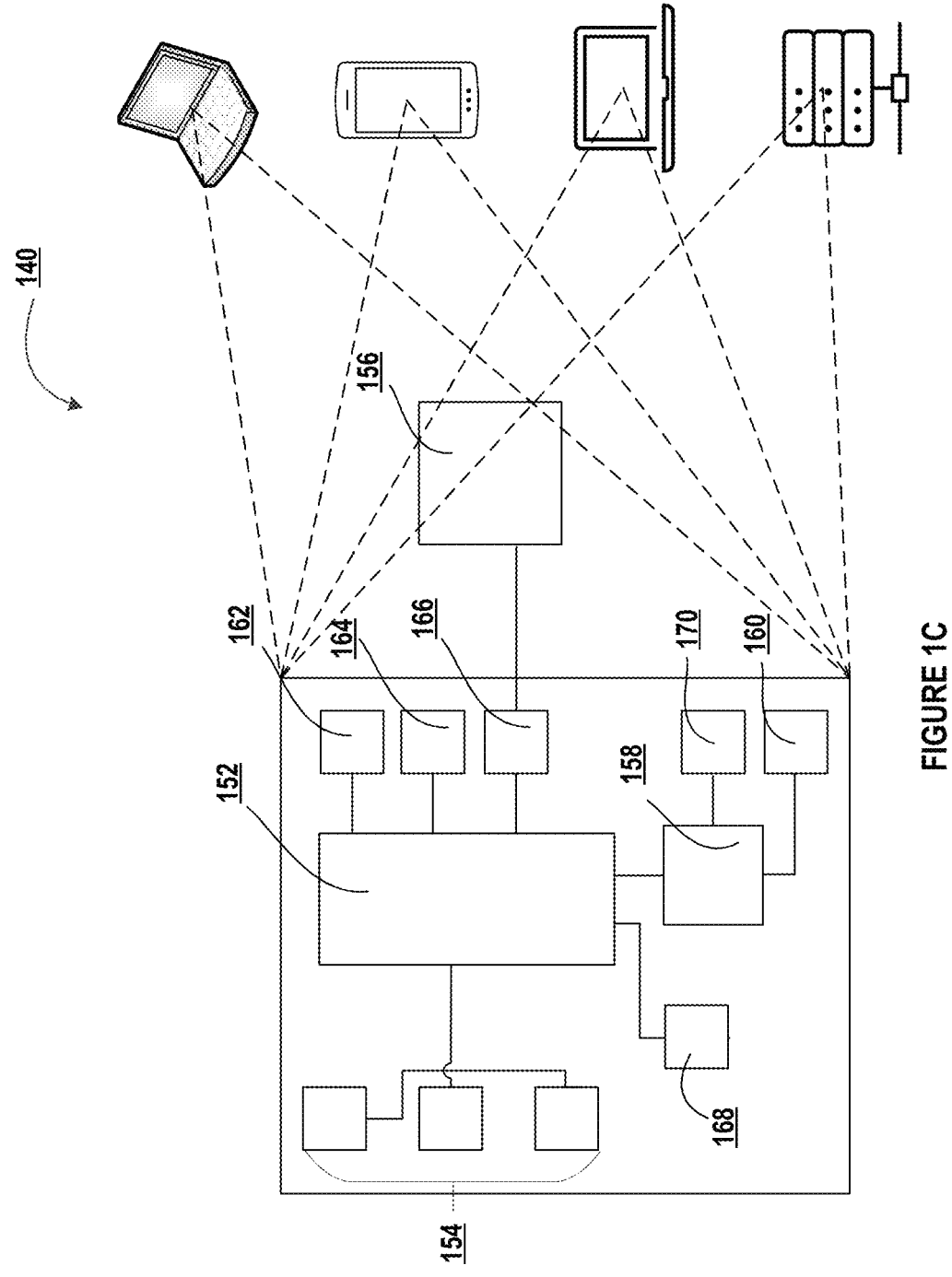

FIGS. 1A-1C illustrates technical components of an exemplary distributed computing environment for optimized fingerprinting and tokenization in server drift analysis, in accordance with an embodiment of the disclosure;

FIG. 2 illustrates a process flow for optimized fingerprinting and tokenization in server drift analysis, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

As used herein, "sanitization" refers to the process of modifying data to remove or obfuscate sensitive information, thereby preventing unauthorized access to such information during processing or transmission. Sanitization typically involves replacing identifiable or sensitive values, such as IP addresses, domain names, and personal information, with anonymized or tokenized placeholders. This process ensures that the sensitive data remains secure while still allowing the system to perform accurate comparisons for drift detection. Sanitization may include methods such as masking, encryption, or redaction, depending on the sensitivity and usage of the data being processed.

As used herein, "tokenization" refers to the process of replacing sensitive or environment-specific data values with non-sensitive, unique placeholders, called tokens. These tokens serve as substitutes for actual data but do not reveal the original values they represent. Tokenization is typically employed to protect sensitive information, such as server names, IP addresses, and timestamps, during data transmission or storage. The tokens can be reversed or mapped back to the original data only by authorized parties with access to a secure tokenization system. This process ensures privacy and security, particularly in environments where data is shared or compared across multiple systems.

As used herein, a "cryptographic fingerprint" refers to a unique digital representation or hash value generated from server configuration data. The fingerprint is created using a cryptographic hashing algorithm, such as SHA-256, to ensure that even the smallest changes in the configuration data will result in a different fingerprint. Cryptographic fingerprints are used to uniquely identify files, metadata, or other configuration elements of a server, and they are employed to detect any changes (drift) in these configurations over time. The fingerprinting process is integral to maintaining the integrity and security of server drift analysis by enabling precise comparisons between different states of server configurations.

As used herein, a "historical repository" refers to a centralized, secure storage system that maintains records of server configurations, including cryptographic fingerprints and tokenized content, over time. This repository serves as the database of reference points for detecting server drift by storing both current and past configuration states. The repository is designed to handle large volumes of data from multiple servers and allows for efficient retrieval and comparison of configuration data across different time periods or server environments. By persisting historical configuration data, the system ensures that administrators can track changes and identify discrepancies in server configurations with precision.

As used herein, "server drift" refers to any unintended or unauthorized change in the configuration of a server from its intended or original state. Server drift can occur gradually over time due to software updates, manual misconfigurations, or external factors. Drift may result in discrepancies that could affect server performance, security, or operational efficiency. Detecting server drift is crucial for maintaining the integrity and consistency of server environments. The present system is designed to identify such drift by comparing cryptographic fingerprints and tokenized values of the current server configuration against historical data to detect any significant deviations.

As used herein, "configuration data" refers to the information that defines the settings, parameters, and operational status of a server or system at a given point in time. This data may include, but is not limited to, file system metadata, system settings, environment-specific variables (e.g., IP addresses, server names, and deployment time), and any other information necessary to operate the server. Configuration data is essential for identifying changes in a server's behavior and is used as the input for generating cryptographic fingerprints and detecting drift.

As used herein, a "distributed agent" refers to a software component deployed on individual servers that performs the tasks of collecting, processing, and transmitting configuration data. The distributed agent operates independently on each server, gathering relevant information, such as cryptographic fingerprints, and ensuring that data sanitization and tokenization processes are applied before transmitting the information to the historical repository. These agents function with minimal resource usage to avoid interrupting server operations and work in conjunction with centralized systems to enable efficient server drift detection.

As used herein, the "comparison engine" refers to the software module responsible for analyzing the collected and stored configuration data to detect discrepancies or drift between the current and historical states of a server. The comparison engine compares cryptographic fingerprints and tokenized values, identifying configuration differences, mismatches, or anomalies that may indicate changes in the server's settings or operational parameters. This engine performs these tasks efficiently, ensuring that comparisons are conducted in real-time or near-real-time without overloading system resources.

As used herein, a "tokenized placeholder" refers to a non-sensitive, unique identifier that replaces a sensitive or environment-specific value in the configuration data. These placeholders ensure that while the original data is protected and anonymized, it can still be used for accurate comparisons between different server configurations. For example, a tokenized placeholder may substitute an IP address or server name during the data sanitization process, enabling the system to detect changes without exposing the sensitive information.

As used herein, a "report" or "alert" refers to the output generated by the system when server drift is detected. A report may include a detailed summary of the configuration differences identified, along with visual representations of the drift between current and historical states. An alert, on the other hand, may be a notification sent to system administrators in real-time when a significant change or drift is detected, prompting immediate action to resolve the issue. These outputs are customizable based on user preferences and operational needs.

As used herein, a "predefined threshold" refers to a specific value or criterion set by an administrator to determine the significance of detected server drift. The threshold may relate to the number of configuration discrepancies, the severity of changes, or the potential impact on system performance or security. When the drift exceeds the predefined threshold, the system triggers an alert or generates a report to notify administrators. The use of thresholds ensures that only meaningful or critical changes are flagged for review, optimizing system efficiency and reducing the noise from minor configuration changes.

The present disclosure relates to systems, methods, and computer program products for optimized detection of server configuration drift. By employing distributed agents and optimized processes such as fingerprinting, data sanitization, and tokenization, the system is able to compare configurations across multiple servers, environments, and time periods. This innovative approach ensures both efficiency and accuracy in drift detection, particularly in complex server infrastructures like enterprise data centers and cloud environments.

In server administration, it is common for server configurations to gradually deviate from their intended states over time, a phenomenon known as "server drift." Detecting and managing this drift is critical to avoid performance degradation, security vulnerabilities, and system outages. Existing solutions are often inefficient, requiring manual intervention or resource-intensive processes that fail to scale for large environments. Additionally, current methods may expose sensitive data during the comparison process or fail to account for environment-specific variables, making accurate drift detection challenging.

The system described herein automates the process of detecting changes in server configurations by using distributed agents to gather configuration data from servers across different environments. Sensitive data is protected through sanitization and tokenization processes, which anonymize server-specific details like IP addresses and timestamps. By comparing the cleaned and tokenized data, the system can accurately identify configuration changes or "drift" between servers, allowing administrators to address potential issues before they affect system performance or security. This automated approach reduces manual work, increases accuracy, and saves computing resources.

The present disclosure provides a comprehensive system for detecting server configuration drift. This system utilizes distributed agents that collect metadata and configuration data from various servers. It incorporates processes for sanitizing and tokenizing sensitive or environment-specific values, ensuring both privacy and consistency during comparisons. An optimized search and comparison algorithm is employed to detect and flag configuration drift while minimizing resource usage. Additionally, the system is designed to be scalable, making it suitable for large, multi-server infrastructures and allowing for efficient and timely identification of potential server issues.

What is more, the present disclosure provides a technical solution to a technical problem. As described herein, the technical problem includes the inefficient and resource-intensive process of detecting server drift, particularly in large-scale environments where manual or semi-automated solutions fail to scale and may expose sensitive information. The technical solution presented herein allows for automated drift detection by utilizing distributed agents, data sanitization, and tokenization, significantly improving the accuracy and efficiency of drift detection.

In particular, this solution reduces the steps required to compare server configurations by using highly optimized processes, thereby minimizing the use of computing resources such as processing power, storage, and network bandwidth. Additionally, the system improves accuracy by avoiding false positives caused by environment-specific values and ensures that sensitive data is protected through sanitization. By automating what was previously a manual process, the invention also increases the speed and efficiency of detecting and resolving server drift, thereby reducing the impact on system performance and minimizing administrative overhead. Furthermore, the system intelligently allocates the necessary resources, reducing network load and further conserving computing power.

FIGS. 1A-1C illustrate technical components of an exemplary distributed computing environment for optimized fingerprinting and tokenization in server drift analysis 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, entertainment consoles, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link);

the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow for optimized fingerprinting and tokenization in server drift analysis, in accordance with an embodiment of the disclosure. As shown in block 202, the process begins by scheduling the distributed agent on the server to initiate data collection at a predetermined time or under low-priority conditions for all non-transient content, including sensitive values and computes cryptographic fingerprints for files or data. The distributed agent gathers configuration content or all files from the server, which may include files, metadata, and other operational values relevant to the server's state. As part of this data collection, the agent computes cryptographic fingerprints for key elements, such as file modification dates, sizes, and content hashes, ensuring that the server's current configuration is securely represented. These fingerprints provide a unique signature for each configuration component, allowing the system to detect any changes over time. The agent is designed to operate with minimal impact on server performance, ensuring that data collection does not interfere with ongoing operations. This initial data collection step lays the foundation for the drift detection process by securely capturing the server's current state.

In block 204, the process continues as the distributed agent sanitizes the collected configuration data by replacing sensitive values with tokens to ensure sensitive information remains protected. During this step, environment-specific values such as server names, IP addresses, or timestamps are replaced with tokenized placeholders. Tokenization allows these values to be anonymized while still enabling the system to perform accurate comparisons across different servers or time periods. This step is critical for maintaining privacy and compliance with security standards, particularly in large-scale, multi-server environments where exposure of such sensitive data is not desired. The agent ensures that the sanitization process is efficient and seamless, preserving the integrity of the collected data without compromising the server's operational security. By replacing identifiable information with generic tokens, the system ensures that comparisons remain consistent and secure, allowing for accurate drift detection without revealing sensitive details.

Following sanitization, the agent proceeds to block 206, where it the agent transmits the fingerprints of the sanitized and tokenized content along with the original fingerprints and sanitized and tokenized content. The agent transmits the fingerprints and the sanitized content to a centralized historical repository for storage, optional tokenization (to remove environment-specific values for consistency) and comparison. This repository acts as a secure storage location for the server's configuration data over time, maintaining a record of each server's state at various points in its lifecycle. By transmitting the sanitized data, the agent ensures that only the necessary information—free from sensitive details—is stored for future comparisons. The transmission is optimized to reduce network overhead, ensuring that the process does not consume excessive bandwidth or storage resources. The repository can scale to accommodate data from hundreds or thousands of servers, making it an ideal solution for large enterprise environments. This step is essential for enabling future comparisons, as the repository forms the basis for detecting any drift in server configurations over time.

In block 208, the historical repository ingests and persists the transmitted fingerprints and sanitized content, maintaining a database of server metadata for future drift detection analysis. This ingestion process involves securely storing the data in a manner that allows for efficient retrieval and comparison at later stages. The repository organizes the data by various parameters, such as server identity, collection time, and operational environment, ensuring that the data remains accessible and structured for future analysis. Additionally, the system may use versioning to track changes in server configurations over time, creating a comprehensive record of each server's history. By persisting the data in this way, the system ensures that administrators can access historical configurations and compare them against current server states whenever necessary. This step is vital for long-term drift detection, as it creates a foundation of historical data that can be used to identify discrepancies and prevent server performance issues before they escalate.

In block 210, the process moves into the drift detection phase. The system retrieves the stored fingerprints and tokenized content from the historical repository either upon user request or according to a predefined schedule or time period for a grouping of servers. The system retrieves the fingerprints of the original content, and, where applicable, the fingerprints of tokenized content and the sanitized content are retrieved from the repository. Administrators may request comparisons for specific servers or groups of servers across various time periods, depending on operational needs or identified issues. The system intelligently filters and selects the relevant configuration data for comparison, ensuring that only the necessary records are pulled to conserve computing resources. This retrieval step is crucial for identifying configuration changes, as it enables the system to compare the current state of the server with past configurations. By leveraging historical data, the system can identify drift in an efficient and scalable manner, even in environments with a large number of servers or complex configurations.

As depicted in block 212, the retrieved fingerprints and configuration data are then processed by the search and comparison engine to identify differences, or drift, between the current and historical states based on historical fingerprints. The comparison engine is designed to account for the tokenized values, ensuring that differences or mismatches in environment-specific variables such as server names or IP addresses are accurately handled. The system efficiently searches through large datasets, comparing configuration components across servers and time periods to detect any drift that might indicate operational inconsistencies or potential security vulnerabilities. This comparison process is highly optimized to minimize the computational resources required, enabling real-time or near-real-time drift detection without impacting the overall system performance. By automating this process, the system reduces the need for manual intervention, making it faster and more accurate than traditional methods of server configuration management.

In block 214, the system produces results based on the comparison, displaying any detected drift in a visually intuitive format. These results can include detailed reports showing which fingerprints match and which components have diverged from their expected configurations. The system may also highlight content differences, providing administrators with a granular view of exactly what has changed in the server environment. This output can be customized according to user preferences, allowing for filtering of results based on server groupings, time periods, or specific types of drift. The system's visual representation of the data is designed to help administrators quickly assess the scope of the drift and prioritize actions based on the severity of the detected changes. By providing clear, actionable insights, the system empowers IT staff to address configuration issues before they lead to larger problems, such as downtime or security breaches.

Finally, in block 216, the system takes the produced results and generates alerts or detailed reports for distribution to relevant personnel. These alerts can be triggered automatically when significant drift is detected, allowing administrators to take immediate corrective actions. Additionally, the system can generate periodic reports summarizing drift detection activity, helping organizations maintain compliance with internal policies and external regulations. Alerts may be sent through various channels, such as email, dashboards, or integration with existing monitoring tools, ensuring that administrators receive timely notifications. This step is crucial for maintaining the operational health and security of the server infrastructure, as it allows for proactive management of drift and ensures that configuration discrepancies are addressed promptly. By closing the loop with automated alerts and reports, the system creates a comprehensive workflow for continuous server drift detection and management.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for optimized fingerprinting and tokenization in server drift analysis, the system comprising:
    a processing device;
    a non-transitory storage device containing instructions when executed by the processing device, causes the processing device to perform the steps of:
        collecting configuration data from a plurality of servers, wherein the configuration data includes sensitive information and environment-specific values;
        generating cryptographic fingerprints for the configuration data;
        sanitizing the configuration data by tokenizing the environment-specific values and sensitive information;
        transmitting the sanitized fingerprints and tokenized data to a historical repository;
        comparing the sanitized fingerprints and tokenized data with previously stored configuration data in the historical repository to detect drift between current and historical server states; and
        generating a report or alert based on the detected drift, wherein the report or alert includes an indication of the configuration differences.

2. The system of claim 1, wherein executing the instructions further causes the processing device to: retrieve configuration data from the historical repository based on a predefined schedule or user request to perform the comparison.

3. The system of claim 2, wherein the predefined schedule for retrieving and comparing configuration data is adjustable by an administrator to occur at specific intervals.

4. The system of claim 1, wherein the step of sanitizing the configuration data further comprises replacing environment-specific values, including server names, IP addresses, and timestamps, with tokenized placeholders to ensure privacy and consistency during comparisons.

5. The system of claim 1, wherein the report or alert generated based on the detected drift includes visual representations of the differences between the current and historical configuration data.

6. The system of claim 1, wherein executing the instructions further causes the processing device to: automatically send an alert when the detected drift exceeds a predefined threshold, indicating significant changes in the server configuration.

7. The system of claim 1, wherein the cryptographic fingerprints generated for the configuration data include file modification dates, sizes, and content hashes to ensure unique identification of configuration components.

8. A computer program product for optimized fingerprinting and tokenization in server drift analysis, the computer program product comprising a non-transitory computer-readable medium comprising code causing an apparatus to:
    collect configuration data from a plurality of servers, wherein the configuration data includes sensitive information and environment-specific values;
    generate cryptographic fingerprints for the configuration data;
    sanitize the configuration data by tokenizing the environment-specific values and sensitive information;
    transmit the sanitized fingerprints and tokenized data to a historical repository;
    compare the sanitized fingerprints and tokenized data with previously stored configuration data in the historical repository to detect drift between current and historical server states; and
    generate a report or alert based on the detected drift, wherein the report or alert includes an indication of the configuration differences.

9. The computer program product of claim 8, wherein the code further causes the apparatus to: retrieve configuration data from the historical repository based on a predefined schedule or user request to perform the comparison.

10. The computer program product of claim 9, wherein the predefined schedule for retrieving and comparing configuration data is adjustable by an administrator to occur at specific intervals.

11. The computer program product of claim 8, wherein the step of sanitizing the configuration data further comprises replacing environment-specific values, including server names, IP addresses, and timestamps, with tokenized placeholders to ensure privacy and consistency during comparisons.

12. The computer program product of claim 8, wherein the report or alert generated based on the detected drift includes visual representations of the differences between the current and historical configuration data.

13. The computer program product of claim 8, wherein executing the instructions further causes the processing device to: automatically send an alert when the detected drift exceeds a predefined threshold, indicating significant changes in the server configuration.

14. The computer program product of claim 8, wherein the cryptographic fingerprints generated for the configuration data include file modification dates, sizes, and content hashes to ensure unique identification of configuration components.

15. A method for optimized fingerprinting and tokenization in server drift analysis, the method comprising:
    collecting configuration data from a plurality of servers, wherein the configuration data includes sensitive information and environment-specific values;
    generating cryptographic fingerprints for the configuration data;
    sanitizing the configuration data by tokenizing the environment-specific values and sensitive information;
    transmitting the sanitized fingerprints and tokenized data to a historical repository;
    comparing the sanitized fingerprints and tokenized data with previously stored configuration data in the historical repository to detect drift between current and historical server states; and
    generating a report or alert based on the detected drift, wherein the report or alert includes an indication of the configuration differences.

16. The method of claim 15, wherein the method further comprises: retrieve configuration data from the historical repository based on a predefined schedule or user request to perform the comparison.

17. The method of claim 16, wherein the predefined schedule for retrieving and comparing configuration data is adjustable by an administrator to occur at specific intervals.

18. The method of claim 15, wherein the step of sanitizing the configuration data further comprises replacing environment-specific values, including server names, IP addresses, and timestamps, with tokenized placeholders to ensure privacy and consistency during comparisons.

19. The method of claim 15, wherein the report or alert generated based on the detected drift includes visual representations of the differences between the current and historical configuration data.

20. The method of claim 15, wherein the method further comprises: automatically send an alert when the detected drift exceeds a predefined threshold, indicating significant changes in the server configuration.

* * * * *